(12) United States Patent
Wabnegger et al.

(10) Patent No.: US 10,770,872 B2
(45) Date of Patent: *Sep. 8, 2020

(54) FLEXIBLE ELECTRICAL ISOLATION DEVICE

(71) Applicant: Quanta Associates, L.P., Houston, TX (US)

(72) Inventors: David Karl Wabnegger, Burnaby (CA); Robert Wayne Palmer, Houston, TX (US); Jody Milton Greer, Houston, TX (US); Michael Howard Boudreau, Salmon Arm (CA)

(73) Assignee: Quanta Associates, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/670,966

(22) Filed: Oct. 31, 2019

(65) Prior Publication Data
US 2020/0067286 A1 Feb. 27, 2020

Related U.S. Application Data

(63) Continuation of application No. 16/246,747, filed on Jan. 14, 2019, which is a continuation-in-part of
(Continued)

(51) Int. Cl.
*H02G 1/04* (2006.01)
*H02G 7/20* (2006.01)

(52) U.S. Cl.
CPC .............. *H02G 1/04* (2013.01); *H02G 7/20* (2013.01); *Y10T 29/49117* (2015.01)

(58) Field of Classification Search
CPC . H02G 1/04; H02G 7/20; H01B 17/02; H01R 4/66
(Continued)

(56) References Cited

U.S. PATENT DOCUMENTS

| 2,509,100 A | 5/1950 | Claude |
| 3,226,470 A * | 12/1965 | Bryant ................. F16G 11/048 174/79 |

(Continued)

FOREIGN PATENT DOCUMENTS

| AR | P030102349 | 3/2005 |
| CL | 608-1997 | 10/1997 |

(Continued)

OTHER PUBLICATIONS

Prakash, Ranjan, "Indian Patent Office—Examination report under sections 12 & 13 of the Patent Act, 1970 and the Patent Rules, 2003", dated Oct. 15, 2019, 7 pages, Intellectual Property India—The Patent Office, Delhi, India.

(Continued)

*Primary Examiner* — William H. Mayo, III
(74) *Attorney, Agent, or Firm* — Oathout Law Firm; Mark A. Oathout; Antony C. Edwards

(57) ABSTRACT

An electrical isolator includes a flexible non-electrically conductive membrane and an inelastic flexible dielectric member journaled in the membrane and extending from the first end of the membrane to the second end of the membrane. First and second couplings are mounted to the ends of the dielectric member. The ends of the membrane are mated in sealed engagement with the couplings so as to fluidically seal the ends of the membrane and the dielectric member within the membrane. The membrane is filled with a dielectric fluid so as to displace any air in the membrane and the dielectric member. The couplings are adapted to couple to objects at opposite ends of the electrical isolator.

27 Claims, 9 Drawing Sheets

Related U.S. Application Data application No. 15/879,691, filed on Jan. 25, 2018, now Pat. No. 10,181,705, which is a continuation of application No. 15/332,113, filed on Oct. 24, 2016, now Pat. No. 9,882,360, which is a continuation of application No. 14/664,724, filed on Mar. 20, 2015, now Pat. No. 9,478,952, which is a continuation-in-part of application No. 14/633,749, filed on Feb. 27, 2015, now abandoned.

(60) Provisional application No. 61/968,543, filed on Mar. 21, 2014.

(58) Field of Classification Search
USPC ...... 174/5, 20, 31.5, 40 R, 42, 45 R, 45 TD, 174/74 R, 78
See application file for complete search history.

(56) References Cited

U.S. PATENT DOCUMENTS

| | | | | |
|---|---|---|---|---|
| 3,300,570 | A * | 1/1967 | Spiece | H02G 15/06 174/38 |
| 3,721,002 | A * | 3/1973 | Pugh | H02G 15/22 29/870 |
| 4,337,923 | A * | 7/1982 | Smith | F16G 11/06 174/79 |
| 4,432,663 | A * | 2/1984 | Lasak | F16G 11/05 174/79 |
| 4,460,159 | A * | 7/1984 | Charlebois | G02B 6/4465 24/129 W |
| 5,013,125 | A | 5/1991 | Nilsson et al. | |
| 5,765,834 | A * | 6/1998 | Engli | E21B 33/136 277/602 |
| 6,253,627 | B1 | 7/2001 | Lee et al. | |
| 2002/0001442 | A1 | 1/2002 | Couvrie et al. | |
| 2005/0133244 | A1 | 6/2005 | Devine et al. | |

FOREIGN PATENT DOCUMENTS

| | | |
|---|---|---|
| CL | 1239-2003 | 12/2003 |
| CL | 473-2004 | 3/2005 |
| CN | 87100369 | 1/1987 |
| CN | 85109023 | 4/1989 |
| CN | 2909644 Y | 6/2007 |
| CN | 103594977 A | 2/2014 |
| GB | 2096836 A | 10/1982 |
| GB | 2341011 | 3/2000 |
| JP | S57-133216 | 2/1981 |
| JP | S58136209 A | 8/1983 |
| JP | 3833801 | 10/2006 |
| WO | PCT/CA1997/00205 | 10/1997 |
| WO | PCT/US2003/18648 | 12/2003 |

OTHER PUBLICATIONS

Bolder, Arthur, "Communication pursuant to Article 94(3) EPC", dated Jun. 19, 2019, 4 pages, European Patent Office, The Hague, Netherlands.

Bolder, Arthur, "Communication pursuant to Article 94(3) EPC", dated Jan. 15, 2020, 5 pages, European Patent Office, The Hague, Netherlands.

Bolder, Arthur, "Communication pursuant to Article 71(3) EPC", dated Mar. 31, 2020, 5 pages, European Patent Office, The Hague, Netherlands.

Nichoy, Carlos Eduardo Guevara, "Office Action No. 3642", dated May 2018, 65 pages, Industria y Comercio Superintendencia, Bogotá, Colombia.

Krishnapillai, Mukunthan, Examination Report No. 2 for Standard Patent Application, dated Aug. 19, 2019, 4 pages, Australian Government IP Australia, Australia.

Bolder, Arthur, Supplementary European Search Report and European Search Opinion, dated Oct. 9, 2017, 7 pages, EPO, Munich, Germany.

* cited by examiner

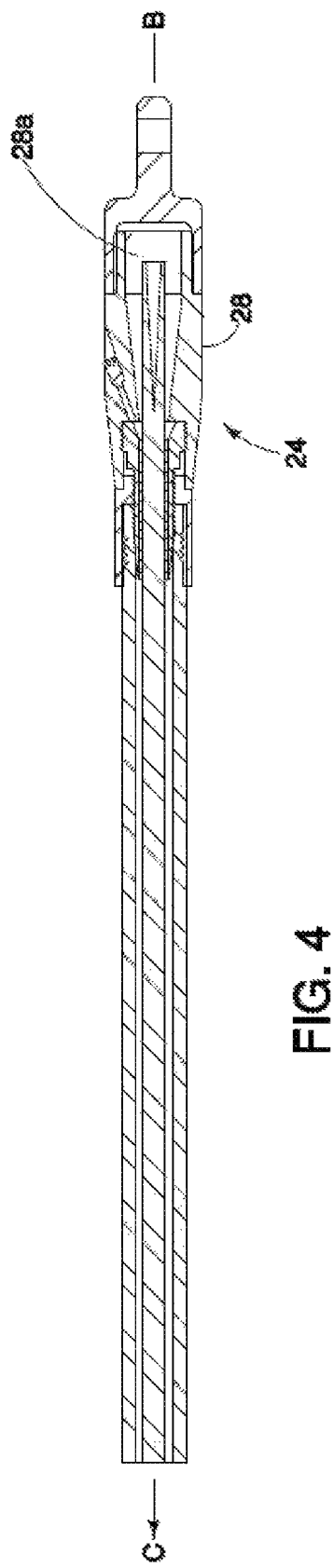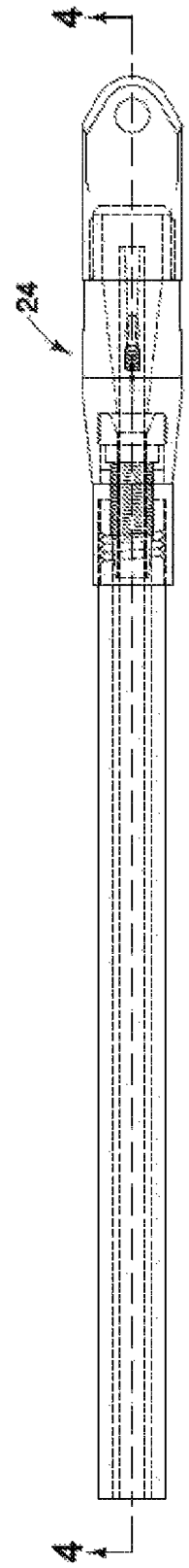
FIG. 4
FIG. 3

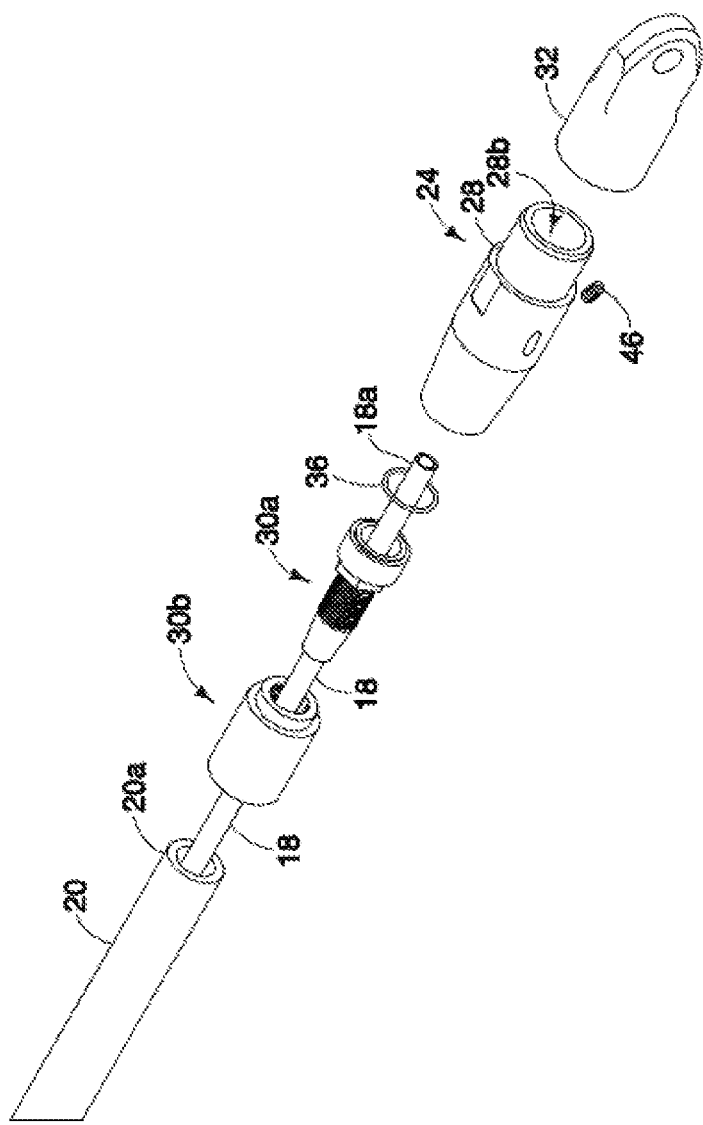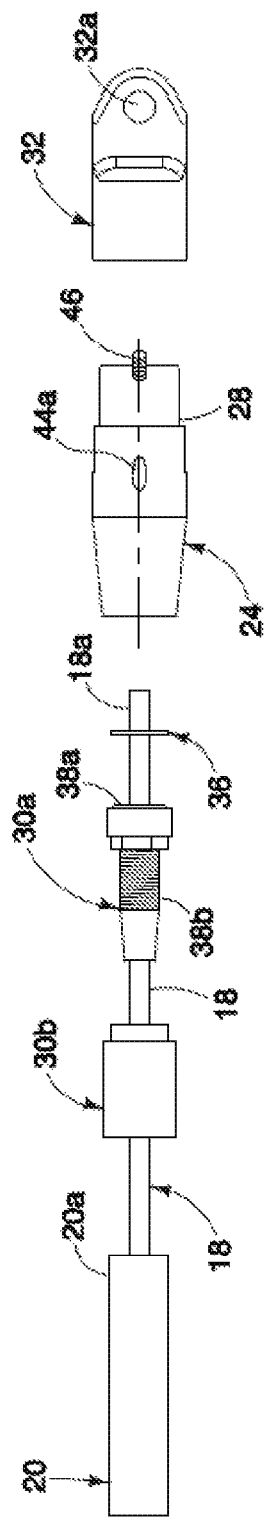

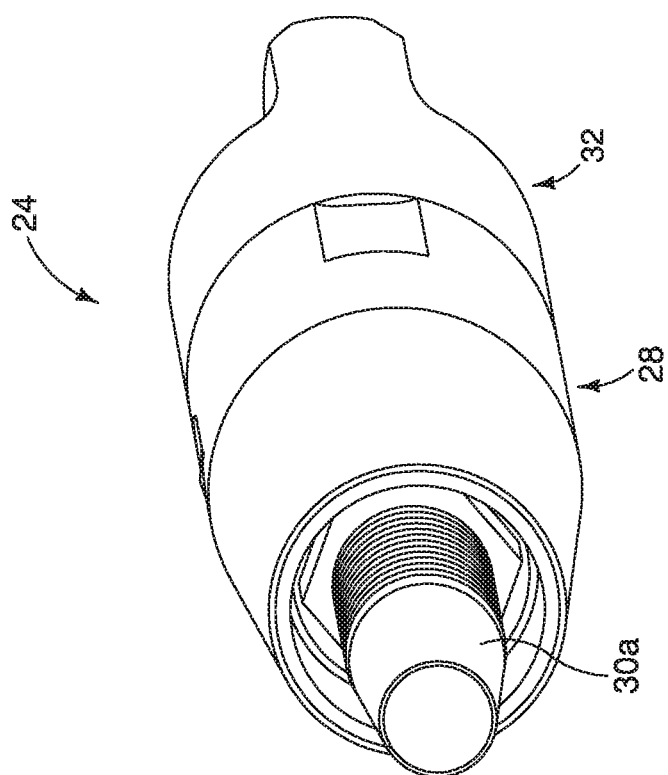

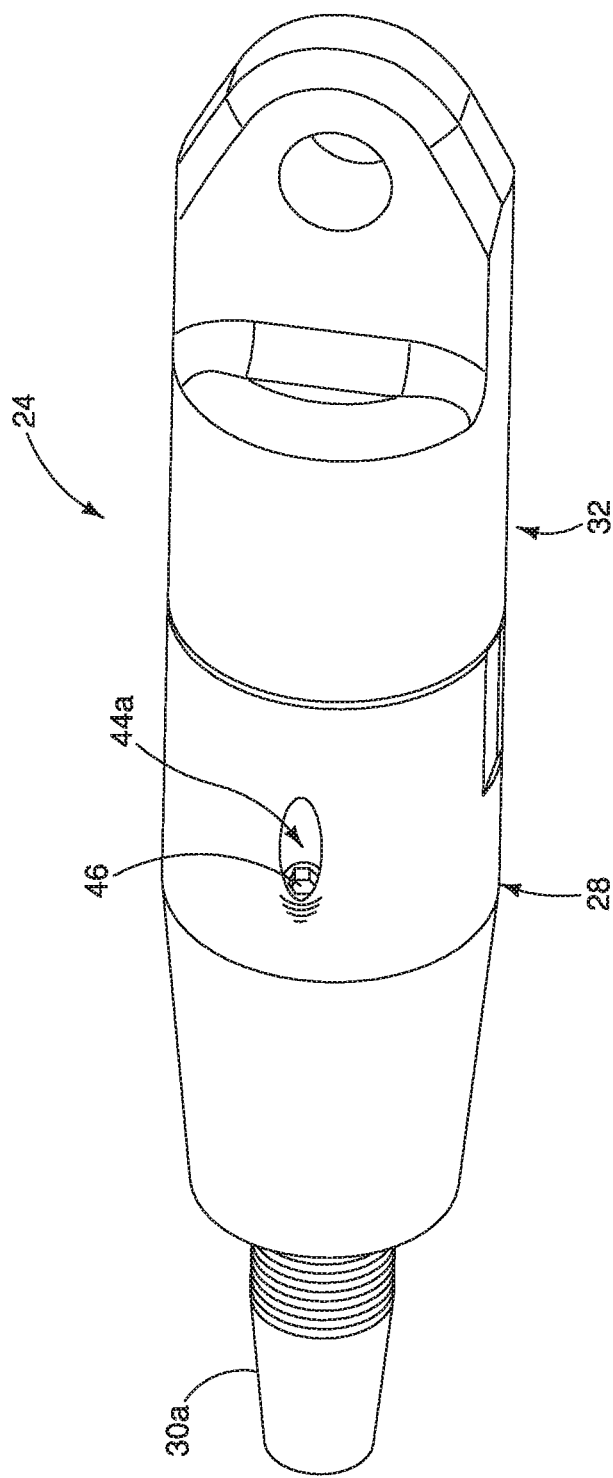

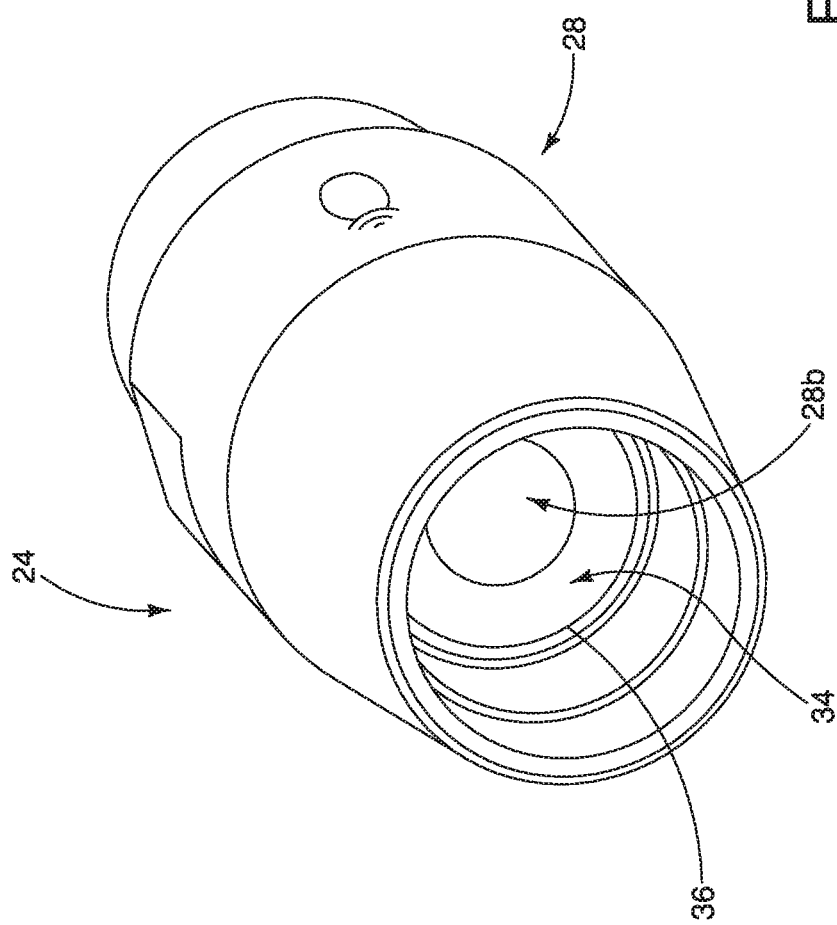

FLEXIBLE ELECTRICAL ISOLATION DEVICE

CROSS-REFERENCE TO RELATED APPLICATIONS

This application is a continuation of U.S. patent application Ser. No. 16/246,747 filed on Jan. 14, 2019 entitled "Flexible Electrical Isolation Device". U.S. patent application Ser. No. 16/246,747 is a continuation-in-part of U.S. patent application Ser. No. 15/879,691 filed on Jan. 25, 2018 which in turn is a continuation of U.S. patent application Ser. No. 15/332,113 filed on Oct. 24, 2016, both also entitled "Flexible Electrical Isolation Device". U.S. patent application Ser. No. 15/332,113 is a continuation of U.S. patent application Ser. No. 14/664,724 filed on Mar. 20, 2015 also entitled "Flexible Electrical Isolation Device". U.S. patent application Ser. No. 14/664,724 is a continuation-in-part of U.S. patent application Ser. No. 14/633,749 filed on Feb. 27, 2015 entitled "Method For Stringing Replacement Optical Ground Wire Or Static Wire Near Energized Power Lines" and claims priority from U.S. Provisional Patent Application No. 61/968,543 filed on Mar. 21, 2014 entitled "Flexible Isolation Device For Wire Stringing". Entireties of all the applications identified in this section are incorporated herein by reference.

TECHNICAL FIELD

This disclosure generally relates to a flexible electrical isolation device, one example of which is for use in replacing energized power lines or in stringing replacement optical ground wire or static wire near or above energized power lines.

BACKGROUND

There are many examples, some of which are provided herein, where the applicant believes it to be beneficial to provide a tensile load bearing, electrically insulating, flexible isolation member which is weather resistant. One example, already mentioned, is for use in replacing, or what applicant refers to as reconductoring or restringing of power line conductors or static wires respectively. Other examples may include the use of the flexible isolation member in a sling line under a helicopter, for example when used to suspend a lineman from the helicopter for power line maintenance work.

Overhead power lines may typically use one or more conductors, or phases, to transmit electricity within an electricity transmission grid. The overhead power lines may be used for bulk transmission of electricity from a power plant to centers of high demand and for distribution within the centers of high demand. The conductors are often supported above the ground by support structures such as poles or towers. Over time the energized transmission lines, referred to herein as energized conductors, may be exposed to harsh weather conditions or become overloaded. Deteriorated or overloaded conductors are replaced by reconductoring.

Static wires may be strung above the conductors to shield the energized conductors from lightning strikes. Occasionally the static wires, which may be conventional static wires or otherwise may be referred to as overhead ground wire, shield wire, earth wire, etc., or which may be optical ground wire (OPGW), collectively referred to herein as static wire, must also be replaced in a process referred to as restringing.

During the reconductoring or restringing process it is often advantageous to use pulling wire instead of pulling rope because the pulling rope may burn, melt, heat-and-break or otherwise fail if moist and/or dirty when exposed to a high voltage environment. Also pulling tensions for transmission conductors is above rope rating. A high voltage environment occurs when pulling conductors or static wire because each may be subjected to a significant induced voltage due to proximity to one or more high voltage energized conductors, for example carrying 69 kV or more. The use of pulling wire advantageously necessitates the use of a flexible, electrically isolating link between the pulling wire and the conductor or static wire that is to be replaced, so as to electrically insulate the conductive pulling wire from the energized, induced or potentially energized, conductor or static wire.

SUMMARY

Accordingly in one aspect, a method for assembling an isolation link is provided. The method steps comprise mounting a flexible membrane having opposite first and second ends around an elongate dielectric flexible member having a plurality of strands and first and second ends. The first end of the flexible member protrudes from the first end of the membrane and the second end of the flexible member protrudes from the second end of the membrane. The method further comprises mounting a first sealing assembly to the first end of the membrane and a second sealing assembly to the second end of the membrane so as to fluidically seal the first and second ends of the membrane. The first and second sealing assemblies' are adapted to couple to a corresponding socket. Each socket has a frustoconical bore, and each frustoconical bore has an interior surface, a narrow opening and an opposite wide opening. The narrow openings of the sockets are adjacent their respective sealing assembly of said first and second sealing assemblies. Further, the method comprises coupling the narrow end of the first socket to the first sealing assembly and the second socket to the second sealing assembly. Further, the first socket is mounted to the first end of the flexible member so that the flexible member extends into the bore of the first socket, and the second socket is mounted to the second end of the flexible member so that the flexible member extends into the bore of the second socket. The first and second ends of the flexible member are broomed so as to form corresponding first and second broomed strands so as to expand the ends of the flexible member within the frustoconical bores of the first and second sockets respectively. A liquid fixing agent is inserted into the first and second broomed strands and the frustoconical bores of the first and second sockets, so as to substantially fill voids between the rope strands of the first and second broomed strands and between the first and second broomed strands and the inner surface of the frustoconical bore, and so that the liquid fixing agent is substantially uniformly infiltrated into the narrow ends of the first and second sockets. The method further comprises curing the liquid fixing agent to secure the first and second broomed strands within the first and second frustoconical bores respectively, and mounting a first coupler to the wide end of the first socket and a second coupler to the wide end of the second socket.

Accordingly, in another aspect, a method of assembling an isolation device for use in repair or replacement of energized power lines and components associated therewith is provided. The method comprises locating a first distal end portion of a dielectric rope in a first socket so that at least a length of the first distal end portion of the rope resides within a frustoconical cavity of the first socket. Further, a non-porous, non-rigid tube is located over a length of the dielectric rope. The tube extends up to a first, narrow end of the first socket cavity. Further, at least a first distal end portion of the tube is coupled to the first, narrow end of the first socket so as to make a fluidic seal therebetween. The method further comprises using a liquid-to-solid resin setting to set the first distal end portion of the rope within the first socket cavity so as to prevent movement of the first distal end portion of the rope within and along the longitudinal axis of the first socket cavity. Further, the above-stated steps are repeated for coupling and fluidically sealing at least a second distal end portion of the tube to a corresponding second socket and, a liquid-to-solid setting resin is used to set a second distal end portion of the rope within a frustoconical cavity of the second socket. The tube is then filled with a dielectric fluid so as to displace any air in the tube and the dielectric rope.

Accordingly, in another aspect, an electrical isolation device is provided. The device comprises a dielectric rope having first and second opposed distal end portions and first and second sockets for receiving the first and second opposed distal end portions of the rope within their respective socket cavities. Further, the device comprises a non-porous, non-rigid tube extending over a length of the dielectric rope. The tube extends at least up to an inner distal end of each of the first and second socket cavities. The device also comprises first and second couplers located at about the inner distal ends of the first and second socket cavities for coupling at least the first and second distal end portions of the tube to their respective first and second sockets. Leakage of a dielectric fluid contained within the tube is prevented by the first and second couplers and resin setting of the first and second distal end portions of the rope within their respective cavities.

Accordingly, in another aspect, an electrical isolator is provided. The isolator comprises an elongate flexible dielectric member encased in a corresponding length of flexible dielectric tubing filled with dielectric fluid. Opposite ends of the tubing and member are sealed to provide a fluid seal.

BRIEF DESCRIPTION OF THE DRAWINGS

FIG. 3 is a partially cut away side elevation view of the isolation link of FIG. 1.

FIG. 4 is a section view along line 4-4 in FIG. 3.

FIG. 5 is, in perspective exploded view, the isolation link of FIG. 1.

FIG. 6 is, in side elevation view the isolation link of FIG. 5.

FIG. 8 is the coupling of FIG. 7 with the dielectric rope and external component of the hose fitting removed.

FIG. 9 is the coupling of FIG. 8 in opposite perspective view.

FIG. 10 is the coupling of FIG. 8 with internal component of the hose fitting removed to expose the seal face of the socket and the sealing o-ring.

DETAILED DESCRIPTION

Figure 1:
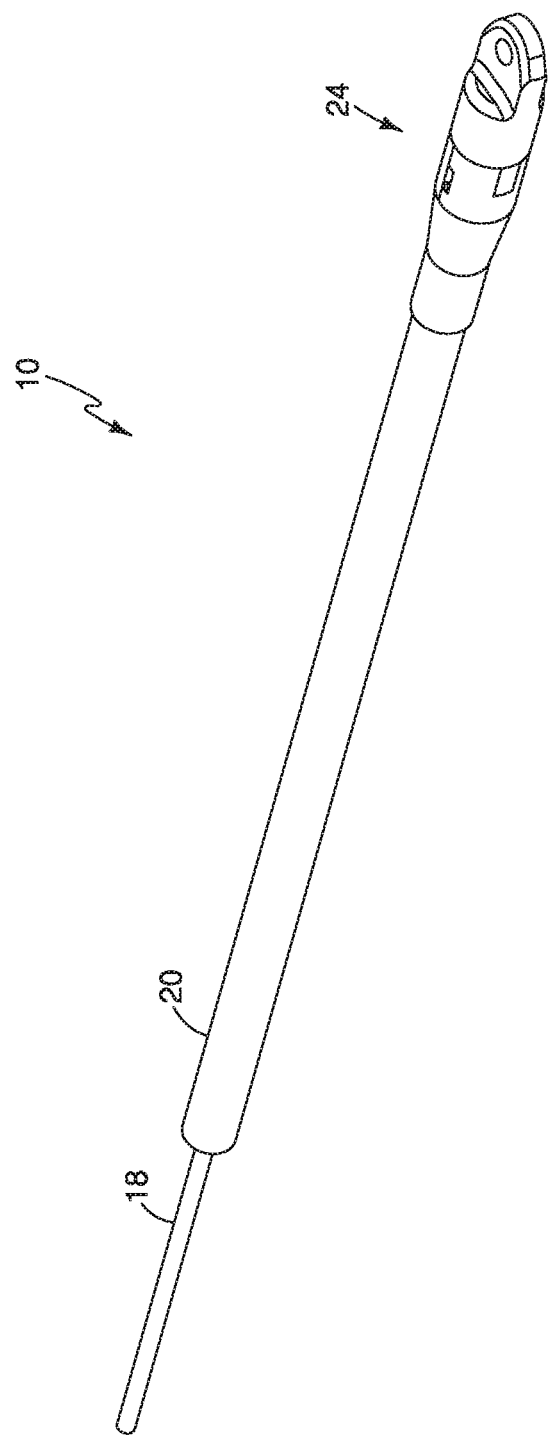
FIG. 1 is, in perspective view, a partly cut-away end view of an example of a flexible, electrically insulated, isolation link.
Figure 2:
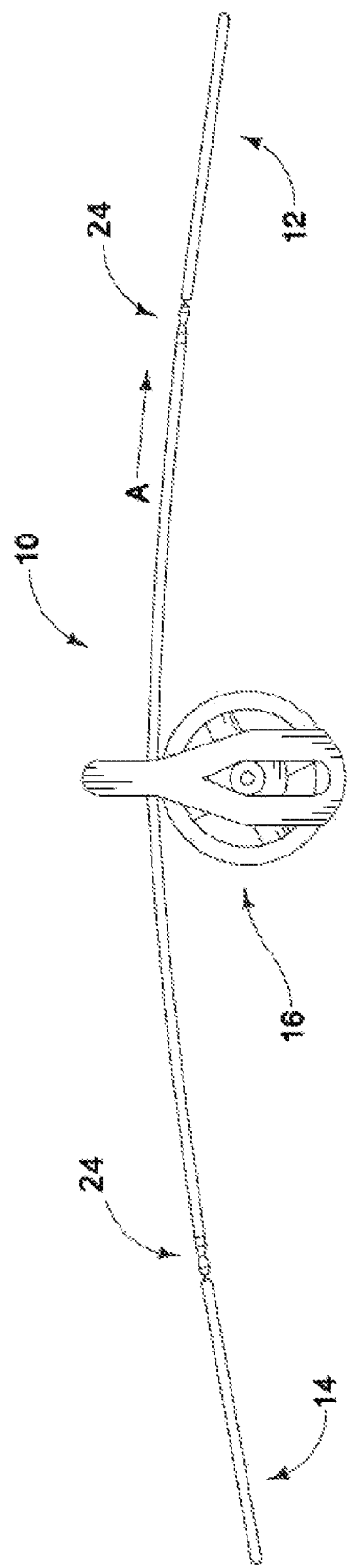
FIG. 2 is a side elevation view showing an isolation link passing through a sheave during pulling.

With reference to the FIGS. 1-10, wherein like parts in each view are denoted by corresponding part numbers, isolation link 10 is a flexible, weather resistant and preferably weather-proof, electrical insulator having at least the following properties: a) it does not conduct electric current; and b) it will bear a tensile load of, for example, 30,000 to 50,000 lbs. depending on the particular embodiment. In one embodiment, not intended to be limiting, isolation link 10 includes a swivel to allow for swiveling, rotation, or other relative movement along the link 10 of one portion of the link relative to another, so as to relieve torque loading on or at the end of the link due to any torque applied to the link from, for example, a pulling wire or a pulling rope. In other embodiments the swivel may be a conventional, separate component. Isolation link 10 may be a length, for example twelve feet long of tensile and dielectrically tested insulated rope having dielectric properties, protected or shielded from the weather or other adverse elements that may compromise the rope's dielectric properties. The protection or shielding will protect the entire length of insulated rope and may for example take the form of a hose, tube, membrane or like continuous, fluid impermeable, cover or shield.

In the reconductoring or restringing application, isolation link 10 electrically isolates between a pulling wire 12 (and the associated workers and the stringing equipment) and the to-be-replaced conductor or static wire 14 as the pulling wire 12 is strung through the power line system, for example so as to continuously travel in direction A in an uninterrupted motion over one or more sheaves 16.

A description, at least in part, of the isolation link is provided in United States patent application publication no. US 2015/0270035, published on Sep. 24, 2015, entitled Flexible Electrical Isolation Device, and in applicant's United States patent application publication no. US 2015/0249325, published on Sep. 3, 2015 entitled Stringing Procedure to Replace Existing Static Line with OPGW, which are included herein in their entirety by reference.

As described above, isolation link 10 provides, in one embodiment not intended to be limiting, an electrically insulated connection between an old conductor or static wire 14 (e.g. the old conductor or static wire to be replaced) and the pulling wire 12 so as to break an electrical circuit. An example of such an electrical circuit that may be encountered on an energized reconductoring project is referred to as a "circulating current," induced in the de-energized, old conductor being replaced, due to the proximity of the de-energized old conductor to one or more nearby energized conductors. The circulating current may complete or close the circuit by running through the earth underneath the conductors.

Thus, although the replacement or new conductor wire being installed during the reconductoring is not directly energized by a power generating station, the proximity of energized conductors or phases creates an energized environment which may impart an induced voltage and current in the pulling wire and in the new conductor wire. Running grounds are used at each end of the pull, (puller and payout) in order to protect the equipment and the workers who are required to be in close proximity to the wires. However, multiple running grounds, combined with the induced voltage and current, may result in a circulating current with unknown and unpredictable electrical forces. Hence it is desirable to use an isolator link 10.

Although during reconductoring or restringing, a non-electrically conductive pulling rope may be employed during periods of what is arguably considered to be "good weather" instead of an electrically conductive pulling wire, it is in applicant's opinion prudent to use an isolation link in accordance with the present teachings in those situations also, in case of inadvertent deterioration of the pulling rope's dielectric properties due to electrically conductive moisture, dirt, oil or other contamination, which may or may not be evident to an observer. Applicant has found that high voltage levels in the energized conductors, which have been found to induce a voltage and current in proximately located non-energized conductors or static wires, when combined with the adverse effect on the dielectric properties of a pulling rope due to moisture and/or dirt, etc. in or on the pulling rope, may cause the pulling rope to melt and break or otherwise fail. Use of dielectric tested isolation rope installed between the pulling line and the new wire can be used to isolate or separate the running grounds, however the rope itself poses a safety hazard due to the potential for the rope to become contaminated by dirt, oils, airborne particles, high humidity, or precipitation rendering the rope at least semi-conductive thereby eliminating the amount of effective isolation between the pulling line and the new wire, and therefore making the isolation rope weather-proof is an improvement. Improving the dielectric properties of the rope is a further improvement.

Thus, as will now be understood, elimination of the circulating current while providing electrical protection on both ends of the pull may be accomplished by electrically isolating the pulling line or pulling wire from the new wire by using an isolation link 10. This allows the installation of running grounds on both ends of the pull with a reduced danger of creating a circulating current.

In one embodiment, a length of dielectric rope 18 is encased in a flexible, preferably non-tensile-load bearing, dielectric membrane 20. The membrane 20 is filled with dielectric oil 22 or other inert dielectric fluid so as to soak, completely bath and/or surround each individual fibre or strand 18a of the dielectric rope 18, and completely impregnate the dielectric rope 18 to thus exclude air in the interstices between the fibres 18a of the dielectric rope 18 and in any voids between the rope 18 and the flexible, dielectric membrane 20. The length of the isolation link 10 depends on the required electrical insulation, as would be known to one skilled in the art. Typical lengths for isolation link 10 may be in the range of approximately 8-20 feet for high voltage transmission reconductoring (e.g. in the range of 69 kV to 345 kV or greater), or, for example, in the range of 50-250 feet for slinging a load such as a lineman under a helicopter.

Each end of the isolation link 10 is fluidly sealed to maintain the oil 22 or other dielectric fluid in the membrane 20 and in the rope 18, and not leak outside the membrane 20, even under a maximum tensile load of the dielectric rope 18 employed within the membrane 20.

In the applicant's experience, typical tensile loads acting on the isolator link 10 positioned between a pulling wire and a conductor during a reconductoring may be 5,000 lbs. but sometimes approach approximately 12,000 lbs. to 15,000 lbs. Thus, depending on the diameter of rope 18, as a precaution, the isolation link 10 advantageously should be capable of bearing tensile loads along the order of 50,000 lbs. for, for example, ¾ inch diameter rope, so that the isolation link 10 may bear tensile loads of approximately three to four times the typical maximum tensile loads under which the isolation link 10 would be placed during a reconductoring project. It has been found that ¾ inch rope 18 when mounted at its end 18a into socket cavity 28a, could withstand a tensile force in direction C in the order of less than or equal to 50,000 lbs. when socket cavity angle $\square$ was 13.6 degrees and the method described herein was followed.

Thus isolating insulator link or isolation link 10 may be characterized in one aspect as including a flexible elongated tensionally-strong insulating member, such as a dielectric synthetic rope (herein collectively referred to as a flexible member), which is encased in a weather-proof flexible sleeve, hose, tube, or enclosing membrane (herein collectively referred to as a flexible membrane), wherein terminating couplings are mounted at either end of the generally co-terminus flexible member and flexible membrane. The terminating couplings may in one embodiment provide for relative torsion relief and relative bending moment relief between, respectively, for example the pulling line at one end of the isolation link and the new wire at the other end of the isolation link. Optionally, in one embodiment the couplings at either end of the elongated isolation link each include a first joint allowing relative bi-directional movement between two portions, for example two halves, of the coupling. A second joint may be provided allowing relative rotation or swiveling about a longitudinal axis of the coupling. The first joint may for example be a universal joint, or a ball joint, or a tensionally strong flexible stem encased within the coupling. The second joint may for example be a swivel. A single joint may be provided to replace the function of both the first and second joints. Alternatively no swivel or flex joint is provided in the terminating coupling; in which case a separate swivel known in the art may be employed.

As stated above, one example of the flexible dielectric member in isolation link 10 proposed by the applicant uses a length of dielectric rope which is encased in a flexible membrane, wherein the flexible membrane is filled with dielectric fluid, for example silicon oil, so as to impregnate the dielectric rope and exclude air in the interstices or voids between the fibres of the rope and in any voids between the rope and the walls of the membrane. Suitable silicon oil may be STO-50™ silicone Transformer Oil (100% polydimethylsiloxane) sold by Clearco Products Co., Inc. of Willow Grove, Pa., USA. A suitable dielectric fluid 22 may have a viscosity of about 0.5 centi-stoke. Each end of the isolation link is sealed to maintain the dielectric fluid within the membrane and rope, and to keep air and moisture out. The seal or sealing assembly may be provided in a terminating coupling where the ends of the flexible membrane mount to the terminating couplings. In some embodiments, the dielectric fluid may be a high-contrast color as compared to the color of the exterior surface of the membrane and the couplings, so as to enable better visual detection of the dielectric fluid in the event any leaking of the dielectric fluid from the isolation link 10 should ever occur.

The flexible member is flexible or bendable or otherwise substantially non-resiliently deformable while resisting lengthening due to tensile loading (herein, collectively referred to as flexible) to accommodate for example the bending radius of a traveler, sheave, or dolly (sheave 16 as used herein). In one example the flexible member is composed of a flexible, high tensile strength, dielectric material such as rope strands 18b twisted and/or braided into a dielectric rope 18. The isolation link 10, when properly maintained, is advantageously impervious to air, moisture, dirt, oils and airborne particles including dust, thereby mitigating the potential for the isolation link, and in particular the flexible member portion of the isolation link, becoming electrically conductive during use.

As stated above, flexible member may, for example, be a synthetic rope 18 constructed of a plurality of strands or fibers (collectively herein referred to as strands 18b) that may be twisted and/or braided together to form the rope 18. The plurality of strands may be manufactured of a variety of dielectric materials. By way of example, without intending to be limiting, the applicant has found that the dielectric flexible member may be made of a dielectric rope sold under the trademark Plasma® 12 Strand by Cortland Company. Such a dielectric rope, for example, may have a ⅝ inch diameter. Other examples of the flexible member may include ultra-high molecular weight polyethylene (an example of which includes the synthetic ropes sold under the trademark AmSteel® Blue), high modulus polyethylene, aromatic polyamides (otherwise referred to as aramids), para-aramids (an example of which includes the material sold under the trademark Kevlar®), aliphatic or semi-aromatic polyamides (an example of which includes the material sold under the trademark Nylon™), and any other flexible, high tensile strength substantially non-resilient, dielectric materials suitable for constructing an isolation link as described herein that would be known or will become known to a person skilled in the art, such as for example a rope engineer.

The flexible membrane encasing the flexible member is also constructed of dielectric material(s) and may include, for example, a rubber tube or hose suitable for hydraulic fluid applications. Although the flexible membrane may be in the form of a hollow tube or hose, it will be appreciated by a person skilled in the art that the membrane may also include, for example, a sheet of material that is formed, for example, as a sleeve around the flexible member so as to create a sealed membrane encasing the length of the flexible member, or any other method for manufacturing a sealed membrane around a flexible member as would be known or will become known to a person skilled in the art. Optionally, the flexible membrane may be wholly or partially constructed of clear, translucent, or transparent materials (for example if the membrane is a tube having an inspection window strip along its length), so as to facilitate inspection of the dielectric member within the isolation link for degradation or for the presence of air within the sealed membrane or other indications of the state of the components of the isolation member. The flexible membrane may also be reinforced, for example as found in conventional insulated air or hydraulic hoses. The flexible membrane may be sold under the trademark Gorilla® Multi-Purpose Industrial Hose sold by Continental Conti-tech™ and may have an outer diameter of approximately 1¾ inches and an inside diameter greater than the diameter of rope 18. The hose may have an external cover layer and an inner layer. The inner layer may be constructed of a nitrile synthetic rubber. The external cover layer may be constructed of yellow synthetic rubber, and reinforced with a spiral aramid yarn sold under the trademark Carbryn®.

Isolation link 10 includes attachment couplings 24 at either end of a length of a flexible member 18. The couplings 24 themselves are not, at least need not be, constructed of dielectric material and may for example be made of stainless steel. The flexible member 18 is of sufficient length to provide electrical isolation for the rated system voltage to which dielectric flexible isolation link 10 will be exposed without the need for the connection joints or couplings 24 to be dielectric. In the application, without intending to be limiting, of the isolation link 10 being used in a wire replacement procedure, couplings 24 attach isolation link 10 to the pulling wire 12 at a first coupling 24, and to the new or old conductor 14 at a second coupling 12, where the first and second couplings 12 are at opposite ends of isolation link 10.

Coupling 24 may include an eye 32a for attaching to the end of a conductor 14 or pulling wire 12.

As described above, flexible member 18 in one embodiment includes a synthetic dielectric rope encased in a flexible membrane 20, both mounted at each end thereof to a corresponding coupling 24. The dielectric rope is snugly shrouded in a flexible membrane 20, which in one embodiment is flexible tubing. The tubing is slightly shorter than the length of the rope so as to expose the end 18a of the rope 18 as it protrudes from both ends 20a of the tubing 20.

Figure 4A:
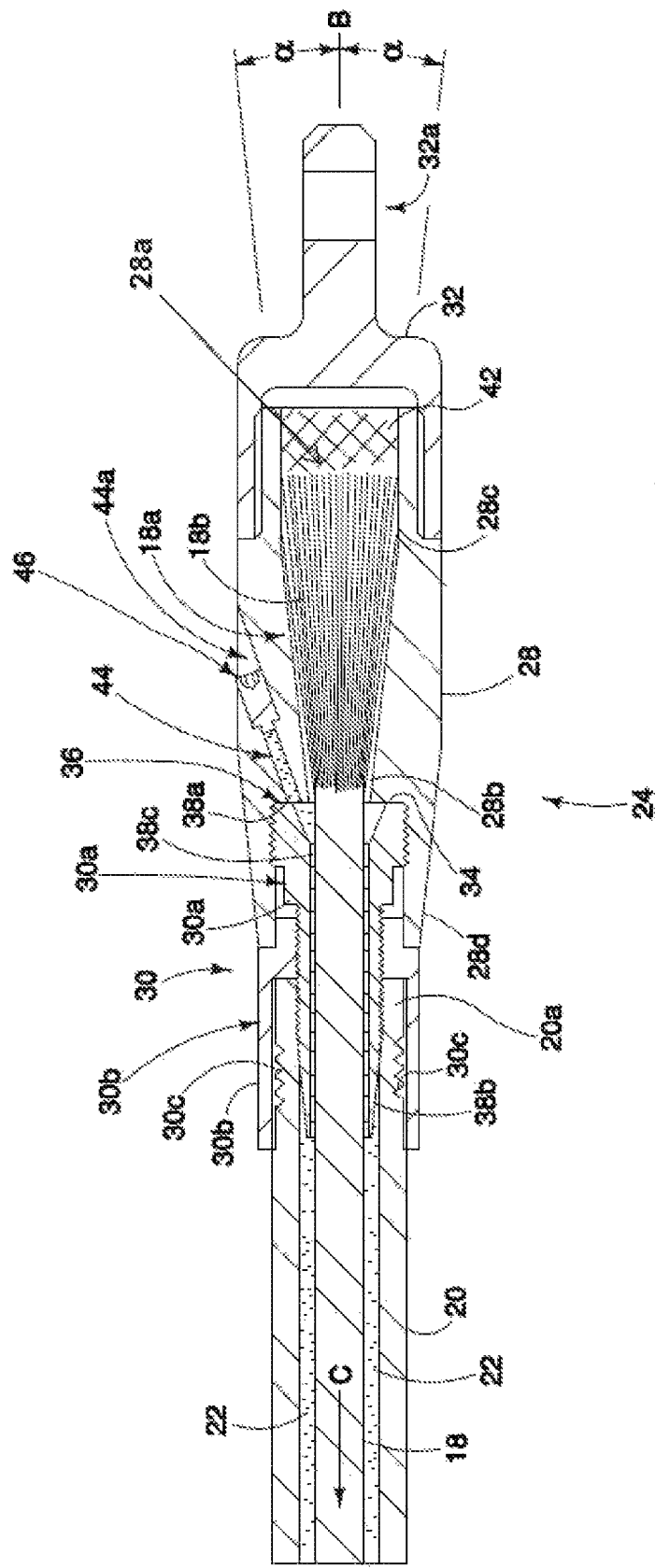
FIG. 4A is an enlarged view of a portion of the end of the isolation link illustrated in FIG. 4.
Figure 7:
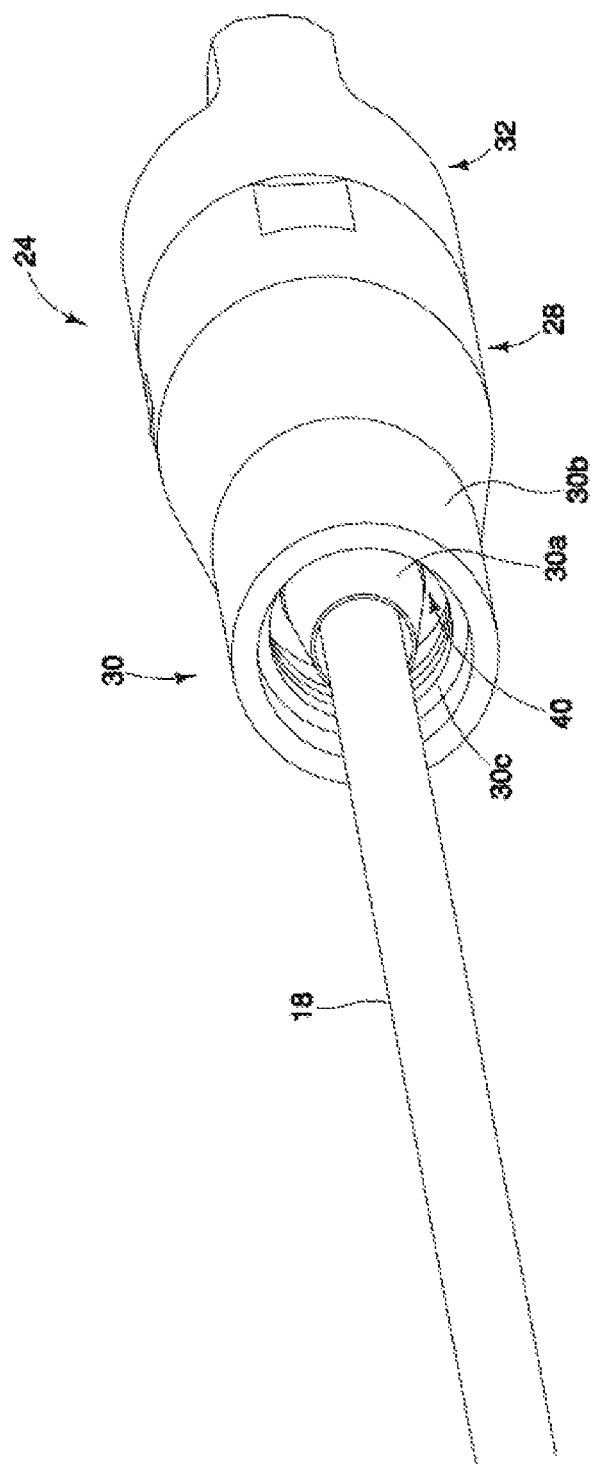
FIG. 7 is, in perspective view, the coupling of FIG. 6 with the flexible membrane removed to show the annular channel between the internal and external components of the hose fitting.

Each coupling 24 includes a socket 28. Socket 28 is hollow along axis B. A conical cavity 28a is formed in socket 28. As best seen in FIG. 4A, the end 18a of rope 18 is exposed beyond the end 20a of flexible membrane 20 and inserted through hose fitting 30 so as to protrude into cavity 28a. The individual strands 18b of rope end 18a are separated so as to substantially fill cavity 28a as cavity 28a opens from its narrow end or neck 28b to its wide end 28c. Socket 28 may be substantially cylindrical along its external surface corresponding to the length of cavity 28a.

A cap 32 having an eye 32a may be mounted, as by threading, onto the end of socket 28 corresponding to the wide end 28c of cavity 28a. Hose fitting 30 is mounted to the end of socket 28 corresponding to the neck 28b of cavity 28a. Without intending to be limiting, hose fitting 30 may include an internal component 30a and an external component 30b. Internal component 30a threadably mounts into the female receiver 28d of socket 28 so as to abut against an annular seal face 34 at, and perpendicular to, the opening into neck 28b. An O-ring 36 is compressed between base 38a of internal component 30a of hose fitting 30 and seal face 34 of socket 28. External component 30b of hose fitting 30 threadably mounts onto the pipe end 38b of internal component 30a so as to define an annular channel 40. End 20a of flexible membrane 20 is held in channel 40, clamped between pipe end 38b and the cylindrical wall of external component 30b, held by threads 30c on the cylindrical inner wall surface of external component 30b. Internal portion 30a of hose filling 30 threads into engagement in female receiver 28d of socket 28.

With the strands 18b of rope 18 separated so as to substantially fill cavity 28a of socket 28, resin, such as epoxy two-part liquid-to-solid setting resin 42 is poured into cavity 28a and infiltrated between the separated strands 18b, preferably so as to exclude any air from between strands 18b from end 28c to neck 28b of cavity 28a. The resin 42 is allowed to set and fully cure.

Although not wishing to be held to any particular theory, it is postulated by applicant that the maximum amount of the tensile load that may be applied in direction C to rope 18, and hence to strands 18b of end 18a of rope 18 held in the solidified resin 42 in cavity 28a may be governed at least in part, by not only the size or diameter of the rope 18 (the larger the diameter, the greater maximum tensile load), but also by the uniformity of the dispersion of resin 42 throughout strands 18b, in particular in neck 28b, and/or where the fluid resin 42 intrudes non-uniformly along rope 18 in the area of neck 28b, for example unevenly intrudes past seal face 34 into the bore base 38a. Non-uniformity of dispersion or intrusion of fluid resin 42 may reduce the maximum loading capacity for rope 18.

Socket 28 has an oil passageway 44 sealed by a threaded set screw plug 46. Oil passageway 44 may be linear, and connects a fill port 44a formed in the side of socket 28 with an oil outlet at the seal face 34. The oil outlet aligns with a conically-shaped or flared opening into bore 38c in base 38a so that oil passageway 44 fluidically communicates along pipe fitting end 38b for the pressurized filling of dielectric fluid 22 into rope 18 and into the spaces between rope 18 and flexible membrane 20 along the entire length of both rope 18 and flexible membrane 20 so as to not have air bubbles or air pockets within membrane 20 or rope 18.

Thus a tension load on isolation link 10 in direction C, along longitudinal axis B, is to be taken up substantially entirely by rope 18 acting on socket 28, and not to a significant degree by flexible membrane 20. In a preferred embodiment, substantially no tensile load is imparted to flexible membrane 20; however, to the extent that any tension load is imparted, the threading 30c on the interior of external component 30b provides additional frictional engagement to the clamping of flexible membrane 20 provided between female receiver 28d of socket 28 and pipe fitting end 38b.

As described above, dielectric rope 18 is typically comprised of a plurality of strands which are for example twisted or braided together to form the rope. During assembly of isolation link 10, the rope 18, constructed of a dielectric material such as those described above, is journaled through the flexible membrane 20 with each end of the rope 18 extending beyond the respective ends of flexible member 20. Next, a sealing assembly, which for example may include socket 28 and hose fitting 30, is mounted to each end of flexible membrane 20 and rope 18 so as to transfer tensile loading on socket 28 to only rope 18 and to seal in the dielectric fluid 22 within membrane 20 even under loading of rope 18.

When the plurality of strands 18b of each rope end 18a are separated they may also be brushed, in a procedure referred to as "brooming," so as to outwardly flare the rope end 18a towards the wide end 28c of cavity 28a while singulating the rope strands 18b.

The liquid fixing agent referred to above as resin 42, may be, an epoxy resin and hardener mixture, prepared by mixing the resin and hardener together (the mixture) so as to avoid or reduce the creation of air bubbles, such as by using an electric stirring machine on a low speed setting, or stirring the mixture slowly by hand. The epoxy resin and hardener mixture is then carefully poured or injected into the socket cavity 28a to direct the flow of the mixture from the wide end 28c towards the neck 28b of the cavity 28a and towards the center of the broomed rope end 18a, so as to substantially completely fill the entire socket cavity 28a with the epoxy resin mixture without spaces or air pockets within the cavity 28a and provide for substantially complete penetration of the rope strands within the cavity 28a.

In some embodiments, advantageously for use in the aforesaid reconductoring or stringing procedure, the applicant has found that the size and angle of the frusto-conical socket cavity 28a and the diameter and density of the rope 18 may be selected such that a ratio of the volume of the mixture of resin 42 to the volume of the rope strands 18b within the cavity 28a is substantially in the range of 1.5 to 2. In other words, the ratio of the Volume$_{(mixture)}$: Volume$_{(rope\ strands)}$ is in the range of substantially 1.5:1 to 2:1. Other ratios may also work, such as 3:1 or 4:1. An example of a suitable resin 42 for assembling the isolation link 10, in the applicant's experience, includes the #105 Epoxy Resin and #205 Hardener supplied by West System. However, this example is not intended to be limiting and it will be appreciated by a person skilled in the art that other suitable liquid fixing agents may be used and come within the scope of the present disclosure.

Once the resin 42 has cured, at this stage of the assembly a tensile load may be applied to the rope 18 encased within the membrane 20 so as to settle the cured resin 42 within the socket 28. It has been found that the cured resin may settle by a small amount, for example 1/16-1/8 inch (1.6 mm-3.2 mm) upon tensioning.

It has been found that if the flexible membrane 20 is resilient along its length, such as been found to be the case using Gorilla™ tubing referred to above, then pre-tensioning of rope 18 is not required. It has been found that a small tensile loading on Gorilla™ tubing merely causes a stretch in the tubing without pulling the tubing from the hose fittings 30 on couplings 24 or causing a leak of dielectric fluid 22.

Due to the frusto-conical geometry of the socket cavity 28a, the hardened epoxy resin 42 forms a frusto-conical plug of substantially the same geometry of the cavity 28a. Thus, when a tensile force is applied to rope 18 in direction C, the rope end 18a, because it is embedded within the epoxy resin solid plug, remains within the socket 28. For example, without intending to be limiting, the applicant found that during experimental testing a prototype isolation link 10 having 3/4 inch diameter rope 18 withstood pulling forces in the order of 50,000 pounds and the epoxy resin plug and rope end 18a remained seated within cavity 28a.

As stated above, the frusto-conical geometry of the socket cavity 28a may have an angle α measured from centroidal axis B of substantially 13.6°. Where link 10 is for use in reconductoring or stringing, the diameter of the coupling 24 is constrained by the opening size in the annular channel of the pulleys or sheaves 16. Thus the angle □ and wall thickness of socket 28, which dictate the width and length of the couplings 24 are optimized to most smoothly pass the couplings 24 through the sheave channels of sheaves 16. For example, an optimum maximum diameter for a coupler 24 may be approximately between 1.5 and 2 inches, which, given an overall length of the coupling 24 of for example substantially eight inches (including hosefitting 30, socket 28 and cap 32), constrains the angle □ to allow sufficient wall thickness to withstand the applied tensile force.

While the above describes certain examples of the present disclosure, various modifications to the described examples will also be apparent to those skilled in the art. The scope of the claims should not be limited by the examples provided above; rather, the scope of the claims should be given the broadest interpretation that is consistent with the disclosure as a whole.

What is claimed is:

1. An electrical isolation link comprising: an electrically insulating rope encased in the hollow cavity of a flexible dielectric fluid-impermeable weather shielding covering the rope so as to extend along substantially an entire length of the rope between the opposite ends of the rope, a dielectric fluid also encased within the weather shielding, wherein air in interstices between fibers of the rope, air bubbles, air pockets, and air in voids between the rope and the weather shielding are excluded by the presence of the dielectric fluid in the hollow cavity and impregnation of the dielectric fluid into the rope, and wherein the opposite ends of the rope, and corresponding opposite ends of the weather shielding are sealed to form opposite fluidically sealed ends, and wherein each of the sealed ends are mounted to terminating couplings, wherein the rope is mounted to the terminating couplings to take-up substantially an entire tensile load applied to the terminating couplings, and wherein the terminating couplings are adapted to couple to objects at opposite ends of the link, and wherein the objects are chosen from the group consisting of: a pulling line, a replacement conductor, a to-be-replaced conductor, a new replacement conductor, a static wire, a slung load, an aerial vehicle.

2. The link of claim 1, wherein the terminating couplings further each include at least one joint.

3. The link of claim 2, wherein the at least one joint provides for bending of the terminating couplings.

4. The link of claim 2, wherein the at least one joint provides for swiveling rotation of the terminating couplings.

5. The link of claim 1, wherein the weather shield includes a clear membrane to provide for inspection by a user into the hollow cavity.

6. The link of claim 5, wherein the clear membrane is a window strip.

7. The link of claim 1, wherein the aerial vehicle is a helicopter and the slung load is a lineman slung beneath the helicopter.

8. The link of claim 1, wherein the rope fibers are chosen from the group consisting of: polymer, aramid, composite, synthetic.

9. The link of claim 1, wherein the weather shielding is tubing.

10. The link of claim 9, wherein the length of the tubing is less than the length of the rope so that the opposite ends of the rope protrude from the opposite ends of the tubing so as to cooperate with the terminating couplings.

11. The link of claim 10, wherein the terminating couplings each include a coupling cavity and wherein the opposite ends of the rope extend into the coupling cavity and are mounted therein to the corresponding terminating coupling.

12. The apparatus of claim 11, wherein the coupling cavity is frusto-conical.

13. The link of claim 11, wherein the coupling cavity is a socket and wherein each of the ends of the rope are flared within their corresponding socket so as to substantially fill the socket and secured therein by a liquid-to-solid setting compound.

14. The apparatus of claim 13, wherein the socket is frusto-conical.

15. The link of claim 1, wherein the dielectric fluid has been allowed to soak into the rope to exclude the air, air bubbles and air pockets.

16. An electrical isolator comprising: an elongate flexible dielectric member encased in a corresponding length of flexible dielectric tubing adapted to be filled with a dielectric fluid so as to substantially displace any air in said member and said tubing, and wherein the opposite ends of the tubing and member are sealable to provide a fluid seal.

17. The isolator of claim 16, wherein the opposite ends are sealable by couplers and wherein the member and the tubing at either end are mounted to their corresponding coupler, and wherein the member takes up substantially an entire tensile load applied to the opposite ends.

18. The isolator of claim 16, wherein the tubing is filled with the dielectric fluid.

19. An apparatus comprising: a dielectric elongate flexible membrane defining a hollow cavity, a first end, and a second end, wherein the hollow cavity is accessible from each of the first end and the second end of the flexible membrane and is adapted to be filled with a dielectric fluid so as to substantially displace any air in at least said flexible membrane; and a first coupling located at the first end of the flexible membrane, and a second coupling located at the second end of the flexible membrane, wherein an interface between the flexible membrane at the first end of the flexible membrane and the first coupling, and the second end of the flexible membrane and the second coupling, are both fluidly sealed.

20. The apparatus of claim 19, further comprising: a dielectric rope located within the hollow cavity.

21. The apparatus of claim 20, wherein the dielectric fluid is located within the hollow cavity.

22. The apparatus of claim 21, wherein the dielectric fluid is located within interstices of the dielectric rope.

23. The apparatus of claim 21, wherein the dielectric fluid surrounds the dielectric rope.

24. The apparatus of claim 19, further comprising: a dielectric rope located within the hollow cavity; and a joint in the first coupling.

25. The apparatus of claim 24, wherein the joint is a swivel.

26. The apparatus of claim 25, wherein the joint permits bending.

27. The apparatus of claim 19, wherein the rope is connected to the first coupling and the second coupling.

* * * * *